Feb. 24, 1931.                    H. R. McMAHON                    1,793,949
                              BUMPER END CONSTRUCTION
                               Filed July 17, 1930
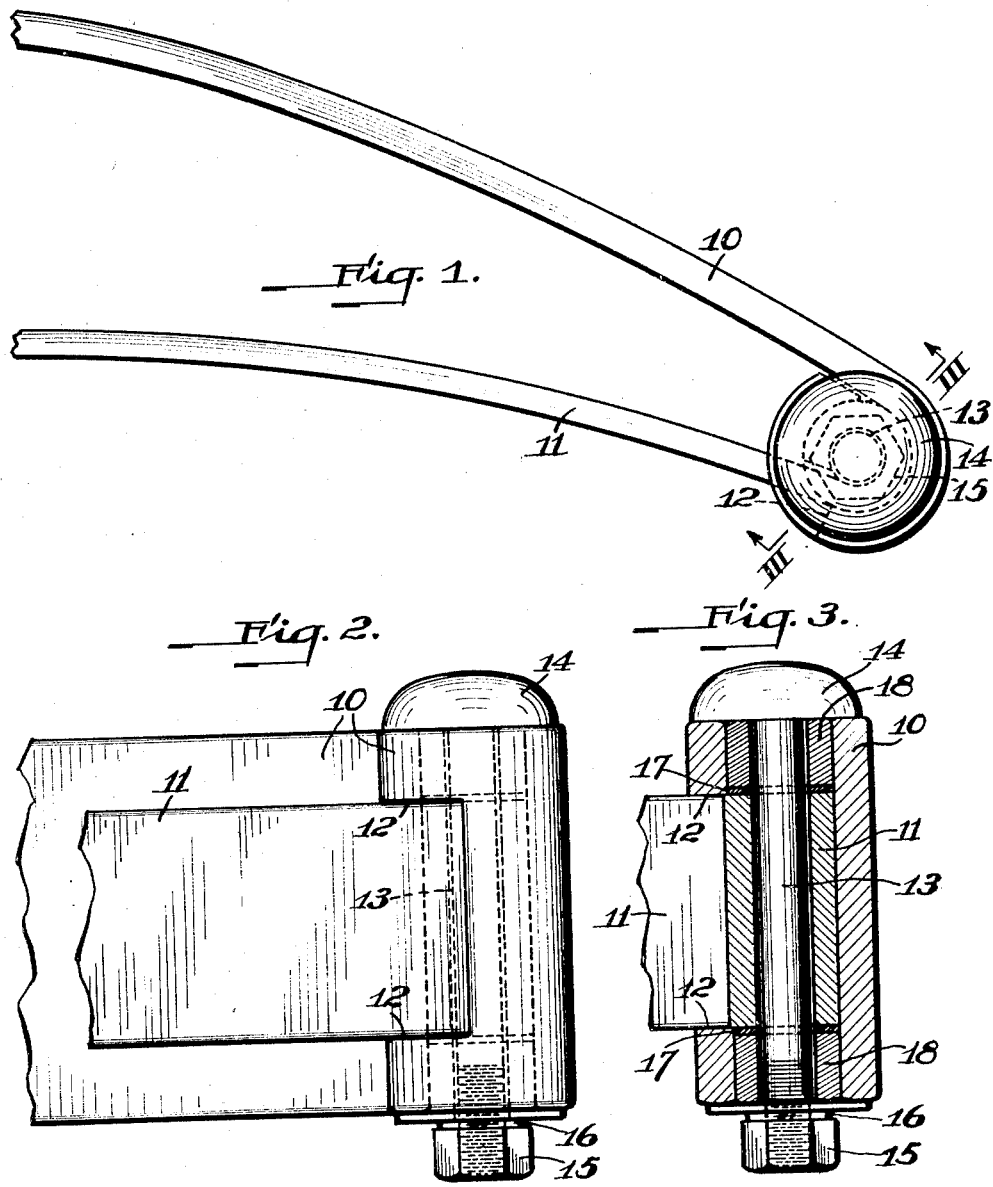
INVENTOR
Harry R. McMahon.
per.
Green + McCallister
Attorneys Patented Feb. 24, 1931

1,793,949

UNITED STATES PATENT OFFICE

HARRY R. McMAHON, OF CORAOPOLIS, PENNSYLVANIA, ASSIGNOR TO STANDARD STEEL SPRING COMPANY, A CORPORATION OF PENNSYLVANIA

BUMPER END CONSTRUCTION

Application filed July 17, 1930. Serial No. 468,616.

This invention relates to a bumper end construction and particularly of the type disclosed and shown in my copending application Serial No. 468,615, filed July 17, 1930, for a Bumper end construction. (Case B)

One object of the present invention is to provide a modified construction which will have certain additional advantages under the conditions for which it was designed.

Another object of the invention is the formation at the end of the single front or impact bar and the rear bar of relatively outer and inner concentric cylinders, respectively, the inner cylinder passing through a slot or cut-out portion of the outer cylinder which is formed with two shoulders of the type of the one shoulder construction shown in my aforesaid copending application.

A further object of this invention is the provision of an especially strong and efficient bumper end construction which is, however, of relatively simple form.

Other and further advantages and objects will be understood from my copending application, or will be pointed out hereinafter.

In the accompanying drawings:

Figure 1 is a plan view of a bumper end construction embodying the present improvement.

Fig. 2 is an elevational view of the same; and

Fig. 3 is a cross section on the line III—III of Fig. 1.

Similar numerals refer to similar parts throughout the several views.

In the drawings, the front and rear bars 10 and 11 are formed with cylinders at their ends as understood from my aforesaid copending application, but the present invention has the additional improvement that the cut-out portion 12 of the outer cylinder does not extend to the bottom edge, but stops short therefrom a distance equal to that between the top of the cut-out portion and the top of the cylinder, thereby forming two shoulders 12, one above and one below the cut-away portion.

The rear bar with its coiled cylinder is inserted in the oppositely coiled first or outer cylinder by temporarily springing the latter open and then permitting it to spring back immediately after the inner cylinder is put in position, it being understood that suitable spacer and lock washer members are inserted at the appropriate time.

This construction, like that of my aforesaid copending application, is provided with a bolt member 13 having an enlarged head 14 and a nut 15 screwed on the lower exteriorly threaded end, the spacer members 18 and the lock washer members 17 being provided as already understoood, together with lock washer 16.

Such a construction provides for a very strong arrangement wherein both the upper and lower edges of the rear bar abut the adjacent edges of corresponding shoulders, the portion of the rear bar adjacent its cylinder working relatively in the slot or cut-away portion of the outer cylinder.

The variations as to size and proportion of the bars may be carried out as explained in my copending application.

What I claim as new and desire to secure by Letters Patent is:

1. In a bumper end construction, a front bar having a cylinder at its end and having a cut-out portion forming an upper and a lower shoulder, and a rear bar having a cylinder at its end adapted to nest within the first named cylinder, the edges of the rear bar adjacent its cylinder abutting said shoulders, and a nut and bolt assembly maintaining the same in operative association.

2. In a bumper end construction, a front bar having a cylinder at its end and having a cut-out portion forming an upper and a lower shoulder, and a rear bar having a cylinder at its end adapted to nest within the first named cylinder, the edges of the rear bar adjacent its cylinder abutting said shoulders, and a nut and bolt assembly maintaining the same in operative association, said cylinders being oppositely coiled and said rear bar operating in said cut-away portion.

3. In a bumper end construction, a front bar having a cylinder at its end and having a cut-out portion forming spaced shoulders therein, a rear bar having a cylinder at its end adapted to nest within the first named cylinder and extend outward through the cut-out portion thereof.

4. In a bumper end construction, a front bar having a cylinder at its end and having a cut-out portion forming a plurality of shoulders therein, a rear bar having a cylinder at its end adapted to nest within the first named cylinder and extend outward through the cut-out portion thereof.

5. In a bumper end construction, a front bar having a cylinder at its end and having a cut-out portion forming shoulders therein and a rear bar having a cylinder at its end adapted to nest within the first named cylinder, and a means for maintaining said cylinders in operative association.

6. In a bumper end construction, a front bar having a cylinder at its end and having a cut-out portion forming shoulders therein, and a rear bar having a cylinder at its end adapted to nest within the first named cylinder and extend outwardly through the cut-out portion thereof, said cylinder being oppositely bent for spacing said front and rear bar.

7. In a bumper end construction, a front bar having a cylinder at its end and a cut-out portion forming shoulders therein, and a rear bar having a cylinder at its end adapted to nest within the first named cylinder, the edges of the rear bar adjacent said cylinder abutting said shoulders, and means for maintaining the same in operative association.

8. In a bumper end construction, a front bar having a cylinder at its end and a cut-out portion forming shoulders therein and a rear bar having a cylinder at its end adapted to nest within the first named cylinder, the edges of the rear bar adjacent its cylinder extending outwardly through the cut-out portion of said first cylinder and means for maintaining the said cylinders in operative association, said cylinders being oppositely bent for spacing said front and rear bars.

In testimony whereof, I have hereunto subscribed my name this 14th day of July, 1930.

HARRY R. McMAHON.